Inventor
HENRY S. HOLMES.
By His Attorneys

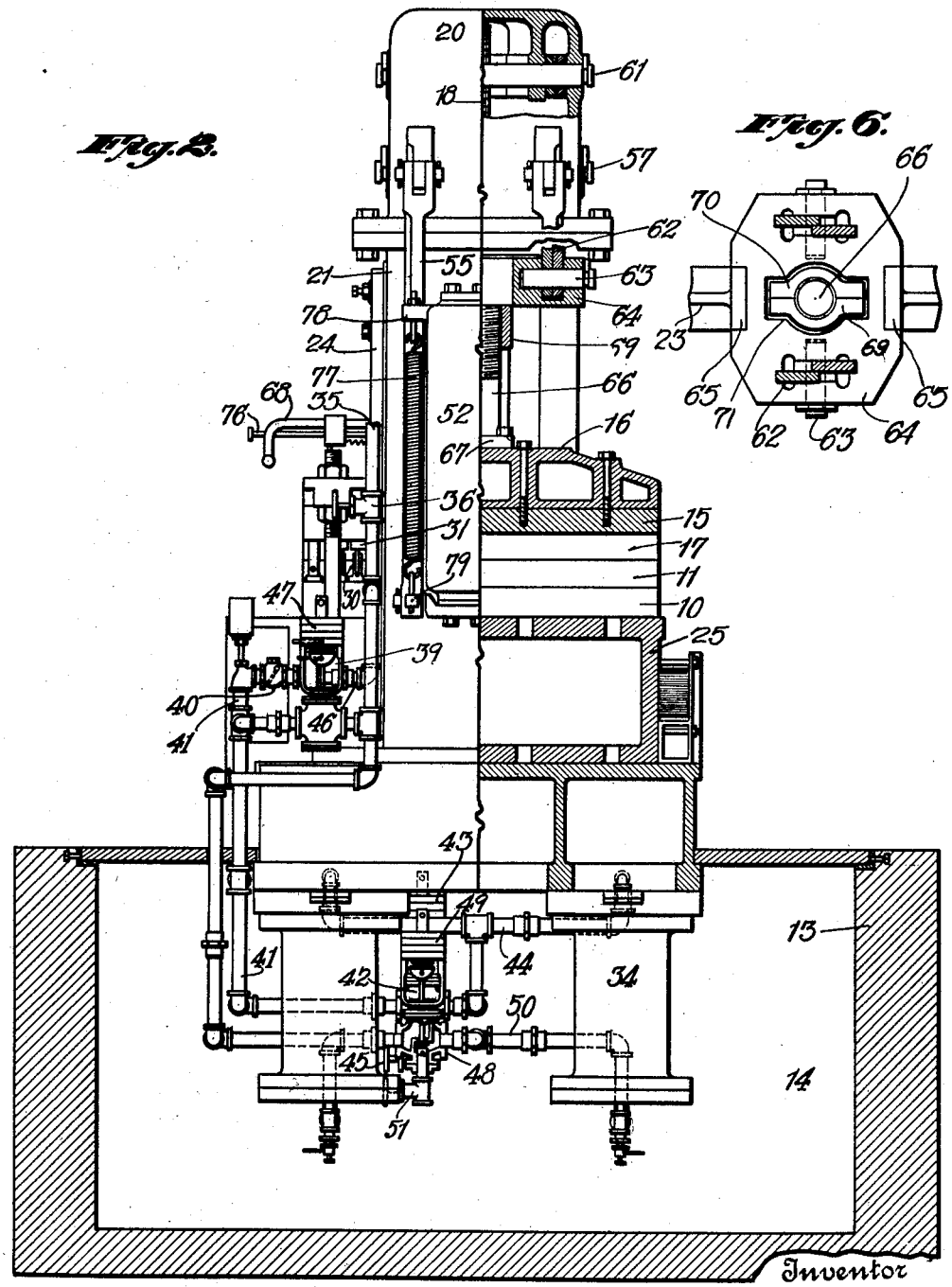

May 31, 1932. H. S. HOLMES 1,861,011
APPARATUS FOR ELECTRIC WELDING
Filed Feb. 28, 1929   3 Sheets-Sheet 3
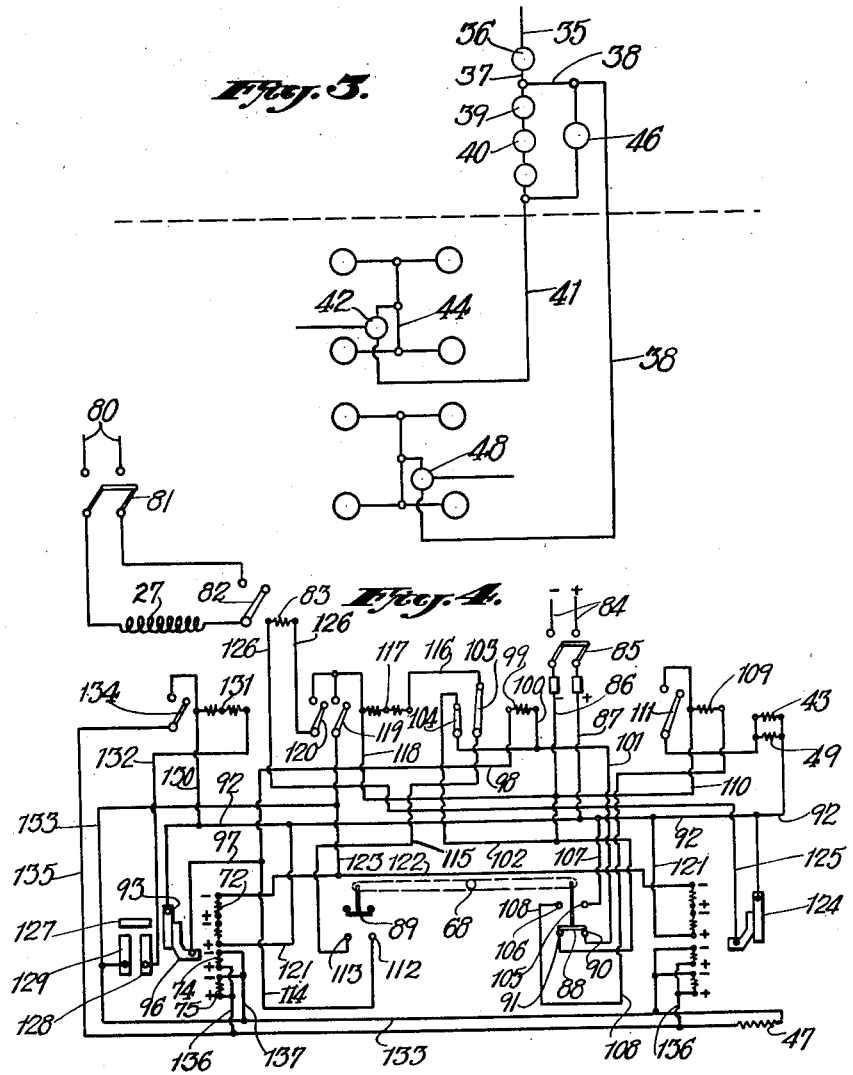
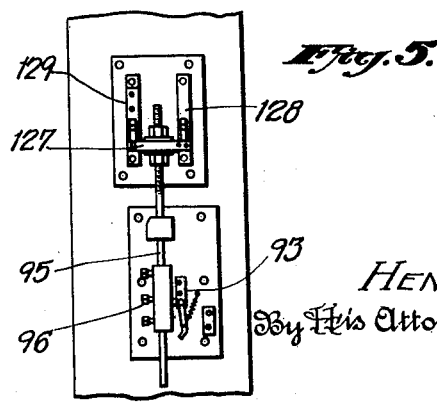
Inventor
HENRY S. HOLMES.
By His Attorneys Patented May 31, 1932

1,861,011

UNITED STATES PATENT OFFICE

HENRY S. HOLMES, OF ROCKVILLE CENTER, NEW YORK, ASSIGNOR, BY MESNE ASSIGNMENTS, TO METROPOLITAN ENGINEERING COMPANY, OF BROOKLYN, NEW YORK, A CORPORATION OF NEW YORK

APPARATUS FOR ELECTRIC WELDING

Application filed February 28, 1929. Serial No. 343,351.

This invention relates to a welding method and apparatus, and more particularly to improvements in the Murray methods and apparatus for electric welding.

In welding by the Murray method, the parts of the article to be welded are held in electrodes which are moved to bring the surfaces at which the articles are to be welded tightly against each other and to pass a very large electric current through these surfaces for a short or limited time to quickly heat them to a fusion or welding temperature. At appropriately timed, successive intervals pressure is applied to the electrodes to press the articles together to the required extent. The electric circuit is then broken and the electrodes separated to free the welded article.

An object of the present invention is to provide pressure applying solenoids or other electro-magnetic pressure applying apparatus to obtain accurately timed, suitably varied pressure to the articles during welding.

Another object of the invention is to provide a method of electric resistance welding in which a slow acting electro-magnetic force is applied to the relatively slow take-up of the metal during the initial part of the welding, and a rapid or quick acting electro-magnetic force is applied to the final pressure application on the parts being welded.

Further objects and features of the invention are to provide pressure applying solenoids for the slow acting and quick acting coils for successive, additive pressure applications and an arrangement of these coils whereby the slow speed coils are first energized followed by the energizing of the quick acting coils, and thus to provide an initial slow take-up and then a rapid pressure application.

Other objects and features of the invention are to provide an improved arrangement of solenoids and pressure cylinders, a simplified lever mechanism for the application of pressure, improved plunger armatures for the pressure applying solenoids and improvements in the control of the energizing cores for the solenoids.

With these and other objects in view the invention comprises the method and apparatus described and set forth in the following specification and claims.

The various features of the invention are illustrated in the accompanying drawings, in which—

Fig. 2 is a side elevation, partly in section, of the welding machine.

Fig. 3 is a piping diagram of pneumatic and air pressure apparatus for moving an electrode of the apparatus.

Fig. 4 is a wiring diagram of the electric circuits used in the apparatus.

Fig. 5 is a side elevation of a solenoid actuated switch of the electric wiring system, and Fig. 6 is a plan view of a cross-head and guides taken on the line 6—6 of Fig. 1.

Figure 1:
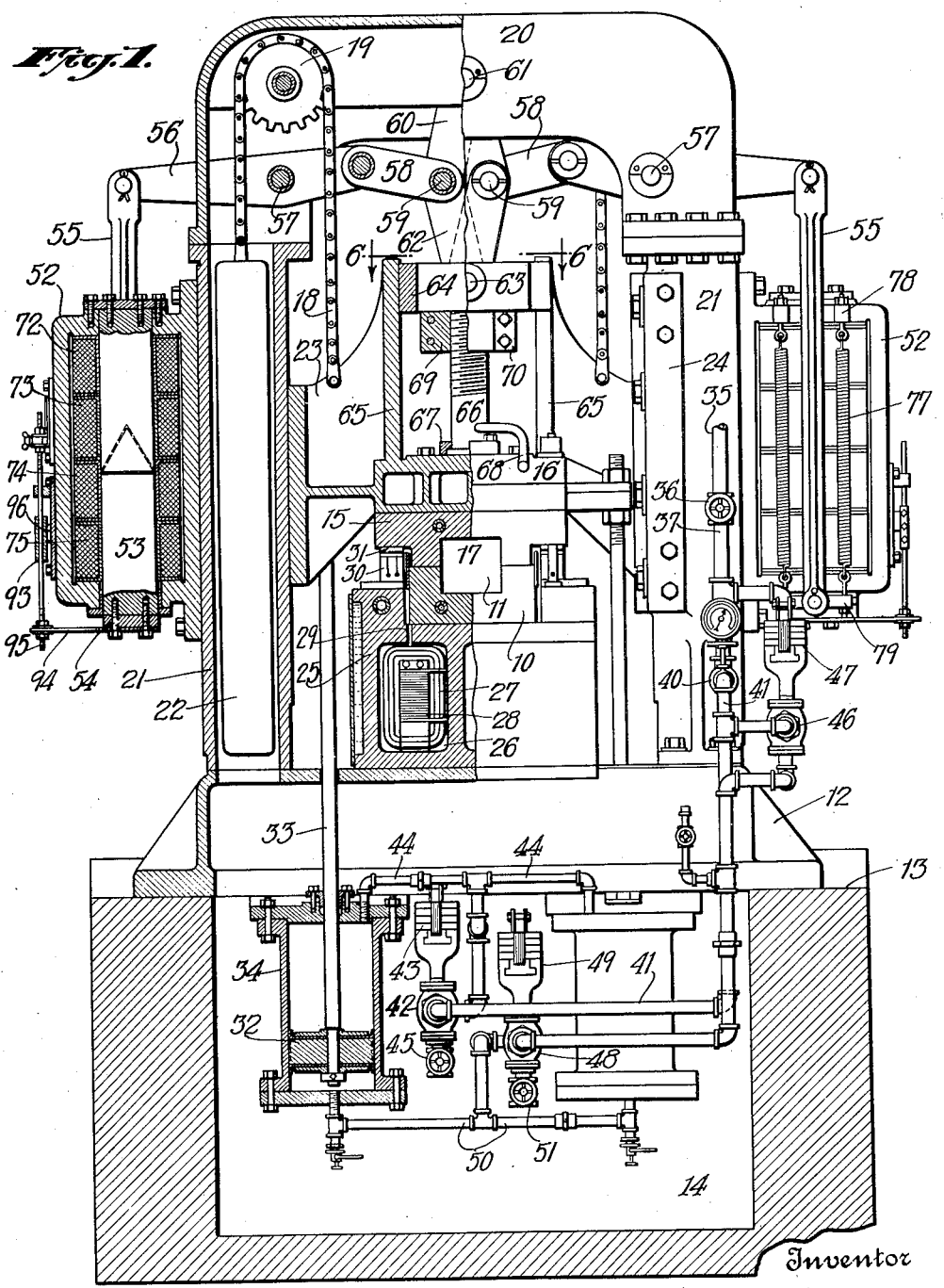
Fig. 1 is a front elevation, partly in section, of a welding machine embodying a preferred form of the invention.

Referring more particularly to Figs. 1 and 2, the invention is illustrated as applied to a welding machine of the Murray type having a lower fixed electrode 10, provided with a central space 11 for holding the part to be welded and supported on a base 12. The base 12 is supported on a concrete foundation 13 having a central space 14 to receive certain parts of the electrode actuating mechanism. A movable electrode 15 is mounted on the under part of a cross-head 16 above the electrode 10 in such position that a recess 17 in the lower face of the movable electrode overlaps or coincides with the recess 11. The cross-head 16 is suspended from chains 18 which pass over pulleys 19 mounted in a cross girder 20 which is supported from the base 12 by means of hollow uprights 21. The weight of the cross-head 16 and electrode 15 is counter-balanced by means of weights 22 secured to the opposite end of the chain 18 within the hollow uprights 21. The cross-head 16, and with it the movable electrode 15, are guided in their vertical movements by means of sidewise projecting guide wings 23 which fit between vertical gibs or plates 24 forming guideways for the wings 23.

The electric current for the electrodes 10 and 15 is supplied by means of a transformer of which the secondary is formed of an annular copper casting 25 positioned between the electrode 10 and the base 12, and having an annular recess 26 in which a primary coil 27 and core 28 are mounted, the core being formed of annular laminae around which the primary coils are wound. When alternating currents are passed through the primary coils 27, secondary currents of relatively low voltage and high amperage are generated in the casting 25 in transverse planes about the central recess 26. An annular slot 29 interrupts the circuit through the casting 25 providing an inner pole or terminal upon which the electrode 10 rests in direct contact, and an outer, annular branch upon which are mounted an annular series of contact switches 30. When the electrode 15 is lowered, contact switch blades 31 arranged in annular position around the lower face of the electrode engage the switch blades 30 thus completing the central circuit from the casting 25 through the switch blades and the upper and lower electrodes 15 and 10.

During the welding operation it will be understood that the parts to be welded project somewhat above and below the edges of the recesses 11 and 17, respectively, so that contact is made through the edges of the article, which accordingly conduct the entire current and are thus rapidly heated to the fusion or welding temperature.

In the present invention the cross-head 16, and with it the electrode 15, are raised and lowered by means of pistons 32 connected to the cross-head 16 by piston rods 33 and vertically slidable in cylinders 34 bolted to the under side of the base 12. The pistons 32 are moved upwardly and downwardly by means of compressed air supplied through a pipe 35 and the controlling valves and pipe shown in Figs. 1 and 2 and in the piping diagram of Fig. 3. From the pipe 35 the compressed air passes through a gate valve 36 to the pipe 37 which leads to the upper parts of the cylinders 34 and to pipe 38, which leads to the lower ends of the cylinders. From the pipe 37 air passes through a reducing valve 39 and a check valve 40 and pipe 41 to a solenoid operated valve 42. The solenoid operated valve 42 is normally closed to the passage of air from the pipe 41 but, upon energizing of its solenoid 43, opens to permit air passing under reduced pressure through the pressure reducing valve 39 to flow into connecting pipes 44 leading to the upper ends of the cylinders 34. When additional pressure is to be exerted on the upper faces of the pistons 32, a by-pass valve 46 controlled by a solenoid 47 is opened to admit air under full pressure from pipe 35 to the pipe 41 and thence through the valve 42 to the upper ends of the cylinders 34. Upon the de-energization of the solenoids 43 the valve 42 closes the passage from the pipe 41 and opens the passage from the top of the cylinder 34 to the atmosphere through an exhaust port 45. Through the branch pipe 38 air is also supplied to a valve 48 which is also controlled by a solenoid 49, and is normally open to admit air through pipes 50 to the lower ends of the cylinders 34 when the solenoid is de-energized, and to close the passage of air from the pipe 38 and to open the passage from the lower ends of the cylinders through pipes 50 and through a vent opening 51 when the solenoid is energized.

It will be apparent that normally when the solenoids 43 and 49 are de-energized, compressed air from the pipe 35 is admitted through pipes 38, valves 48 and pipes 50 to the lower ends of the cylinders 34, while the upper ends of the cylinders 34 are opened to the atmosphere through the valve 42 and vents 45. However, when the solenoids 43 and 49 are energized the valve 42 is opened, admitting air from the pipe 41 to the pipes 44 and upper ends of the cylinders 34, while the lower ends of the cylinders 34 are vented to the atmosphere through the pipe 50, valve 48 and exhaust valve 51. The air passing through the reducing valve 39 is reduced in pressure, but when the solenoid operated valve 46 is open air under full pressure is admitted from the pipe 35 through the branch pipe 38 and valve 46 to the pipe 41 and thence through the valve 42 to the upper ends of the cylinders 34.

The pistons 32 and cylinders 34 serve through the above described piping to raise and lower the cross-head 16 and electrode 15 and to apply pressure to the electrode when it is lowered. To obtain still greater pressure, which is required for taking up the metal as it reaches the welding temperature and compressing it to the desired size, an auxiliary, additive pressure is supplied by means of a pair of solenoids 52 mounted on the hollow supports 21 at opposite sides of the welding machine. The solenoids 52 have central armature cores 53 which are drawn upwardly when the solenoids are energized. The upward movement of the armature cores 53 is transmitted through a yoke or bottom plate 54 bolted to the lower end of the armature, and through connecting links 55 to the outer ends of levers 56 fulcrumed on pins 57 supported in the top girder 20. The inner end of each lever 56 is connected by means of a link 58 to the central pin 59 of a toggle having upper arms 60 pivoted to a pin 61 in the cross girder 20, and lower arms 62 pivoted by means of a pin 63 to a block 64 that is slidable vertically in guideways 65 on the upper end of the cross-head 16. The upward movement of the armature cores 53 upon the energization of the solenoids 52 tilts the lever 56 to a horizontal position, thus pressing the toggle pins 59 inwardly to straighten the toggle. The arrangement of the inner ends of the levers 56 and links 58 is, in effect, a toggle which exerts an increasingly powerful pressure on the pin 59. This pressure on the pin 59 is very greatly magnified as the toggle arms 60 and 62 straighten and thereby exert very great downward force upon the block 64.

The block 64 is freely slidable up and down on the guide 65 of the cross-head 16 but, when the block 64 is in its upper position and the cross-head 16 is lowered, the block 64 may be connected to the cross-head in such a manner as to exert a direct downward pressure thereon. The means for transmitting the downward pressure of the toggle on the block 64 to the cross-head 16 comprises a rotatable, vertical screw 66 resting on the upper face of the cross-head 16 and rotatably supported thereon by means of a stepped or inwardly flanged ring 67. The screw 66 is provided with an outwardly and downwardly extending arm 68 by which it may be rotated through a limited angle. On the upper threaded portion of the screw 66 there is mounted a split nut 69 having flanged portions 70, as shown in Fig. 6, which, in the position shown therein with the arm 68 at the right of its movement, passes freely through corresponding openings 71 in the block 64, but when the nut 69 is below the lower face of the block 64 and is turned with the screw 66 a quarter turn to the left by means of the handle 68, it engages the lower face of the block 64 so that when the latter is pressed downwardly this pressure is transmitted through the nut 69 and the screw 66 directly to the upper face of the cross-head 16. The vertical position of the split nut 69 on the screw 66 may be adjusted by rotating the nut relative to the screw 66.

The solenoid 52 is constructed of a number of solenoid elements 72, 73, 74 and 75, of which 72 and 73 are slow acting and the elements 74 and 75 are quick acting. This difference in the solenoid action may be obtained by any suitable means, as for example by providing a winding of relatively high resistance wound on a brass spool for the solenoid elements 72 and 73, while making the resistance for the solenoid elements 74 and 75 relatively low and winding these solenoids on fiber spools.

In welding according to the method of the present invention, air under pressure is admitted to the upper part of the cylinders 34 to depress the piston 32 and lower the cross-head 16 and the upper movable electrode 15 downwardly towards the fixed electrode 10. This is accomplished by energizing the valve solenoids 43 and 49 which admits air from the pipe 41 to the upper ends of the cylinders 34 and exhausts air from the lower ends through the valve 49 and outlet 51. As the electrode 15 approaches the lower part of its path of travel the switch elements 30 and 31 are brought into contact, thus completing the circuit from the casting 25 through the switch elements 30 and 31 and returning through the parts held by the electrodes 10 and 15. This initial energizing of the solenoids 43 and 49 and lowering of the electrode 15 is initiated by the depression of a push button 76 on the handle 68 of the screw 66. When the pistons 32 have lowered the cross-head 16 until the upper edge of the split nut 69 is below the lower face of the block 64, the handle 68 is given a quarter turn, bringing the flanged portions 70 out of alignment with the opening 75 and, therefore, in position to be engaged by the block 64. Thereupon a circuit is closed through the solenoids 72 and 73 which draws the armature core 53 upwardly, thereby tilting the lever 56 and, through the links 58, moving the toggle arms 60, 62 towards straightened position. When the armature core 53 has reached a definite position in its upward movement, the solenoid elements 74 and 75 are energized to quickly apply the full magnetism to the solenoid and thus complete the upward movement of the armature core 53 with a maximum force. At this time also the solenoid 47 is energized to open the by-pass valve 46 and admit air under full pressure of pipe 35 to the upper part of the cylinders 34. When the armature core 53 reaches the upper limit of its travel the energization of the magnets 72—75 is terminated, permitting the armature core 53 to drop of its own weight and thereby tilting the lever 56, breaking the toggles 60, 62 and drawing the block 64 upwardly. The downward movement of the armature cores 53 is deadened by means of springs 77 secured at their upper ends to projections 78 on the housing of the solenoids 52, and at their lower ends to ears 79 on the bottom plate 54. Thereupon the handle 68 may be swung to the right to permit the block 69 and flanges 70 to pass upwardly through the opening 71. At the same time the valve solenoids 43 and 49 are both de-energized, thereby again admitting air under pressure below the cylinder 34 of the piston 32 and exhausting air from the cylinder 34 above the piston 32, thereby lifting the cross-head 16 and enabling the welded article to be removed and replaced with parts to be welded in a succeeding welding operation.

Through the wiring system shown in Fig. 4 these various steps are carried on automatically in rapid sequence and without danger of improper timing upon the swinging of the handle 68 and manipulation of the push button 76 at the proper time intervals. At the beginning of a welding operation the various parts are in the position shown in Fig. 4.

In this wiring system alternating current is supplied from mains 80 through a switch 81 to the primary winding 27 within the casting 25. The passage of current through the winding 27 is, however, interrupted or broken by a switch 82 which is normally open, but which may be closed upon the energization of a solenoid 83 which controls the switch. Direct current for controlling the various solenoids for energizing the various valve solenoids and for energizing the pressure solenoids 72—75 is supplied from mains 84 through a switch 85 to wires 86 and 87. The admission of current from the mains 86 and 87 to the various controlling solenoids is controlled by means of push buttons 88 and 89 which are normally in their upper position. The push button 88 is, however, depressed when the arm 68 is swung to its right hand position and, when the arm 68 is swung to the left of its movement, the push button 89 is depressed. The push button 88 is released with the handle 68 in its right hand position by a manual push of the push button 76.

At the beginning of a welding operation the push button 89 is in its uppermost position and the push button 88 is depressed as shown in Fig. 4. In this position the push button 88 bridges a pair of contacts 90 and 91, permitting current to flow from the wire 87 through a distributing wire 92 to a slidable contact 93 movable with, and supported on, the armature core 53 by means of an arm 94 projecting outwardly from the plate 54 and carrying a vertical rod 95 on which the contact 93 is mounted. When the armature core 53 is in its lowermost position, the slidable contact 93 contacts with a fixed contact 96 on the side of the solenoid and permits current to pass through wires 97 and 98 to a switch controlling solenoid 99 and thence through wires 100 and 101 to the contacts 90 and 91, and to return through a wire 102 to the return wire 86. Upon the energizing of the solenoid 99, a pair of switches 103 and 104 are closed. Upon the closing of the switch 104 the wire 101 is connected therethrough directly to the return wire 102, bypassing the contacts 90 and 91, and the solenoid 99 thereupon remains energized and the switches 103 and 104 remain closed even though the push button 88 is released and contact broken between the contacts 90 and 91.

Upon pushing the push button 76 of handle 68 the push putton 88 is released and moves upwardly to close contact between a pair of stationary contacts 105 and 106. Current thereupon flows from the wire 92 through a connecting wire 107, through the contacts 105 and 106 and through a wire 108 to a switch controlling solenoid 109 and then returns through wire 110 to the main wire 86. Upon the energizing of solenoid 109 a switch 111 is closed thus permitting current to flow from main wire 87 through the wire 92 and through valve solenoids 43 and 49 to the switch 111, and thence through return wire 110 to the main 86. The energizing of the valve solenoids 43 and 49 operates the valves 42 and 48 to admit air under pressure to the upper part of the cylinder 34 and to exhaust air from the lower part of the cylinder, thereby lowering the cross-head 16 and the electrode 15 into welding position. As the handle 68 is in its right hand position, the nut 69 and flanges are so positioned as to pass downwardly through the opening 71 in the block 64.

When this downward movement is completed the handle 68 is swung to the left thereupon depressing the push button 89 and bringing it into contact with and bridging a pair of contacts 112 and 113. Thereupon current flows from main 87 through the wire 92 and through the solenoid contacts 93 and 96 and wire 97 to a wire 114 leading to the contact 112, and thence through the push button 89 to contact 113. From the contact 113 the current passes through a wire 115 and through the switch 103 which remains closed inasmuch as the solenoid 99 is still energized, and thence through a wire 116 to a controlling solenoid 117 for the switches controlling the slow acting pressure solenoids 72 and 74. From the solenoid 117 the current flows to the return main 86 through a connecting wire 118.

Upon the energization of the solenoid 117 it closes a pair of switches 119 and 120 which control, respectively, the passage of current through the slow acting pressure solenoids 72 and 73 and the alternating current controlling solenoid 83. Upon the closing of the switch 119 current flows from the main 87 through the wire 92 and through connecting wires 121 to the solenoids 73 and 72 on opposite sides of the welding machine, and thence returns through a wire 122 and wire 123 and through the switch 119 to the return wire 118 and return main 86. At the same time current passes from the wire 92 to a slidable contact 124 mounted on the right hand solenoid 52, and similar in construction to the sliding contacts 93—96 described above. From the contact 124 the current passes through a connecting wire 125 to the solenoid 83 and returns through a wire 126, switch 120 and return wire 118 to the return main 86. The switch 82 is thereupon closed at the time that current is passed through the slow acting solenoids, and the current induced in the casting 25 passes through the electrodes 10 and 15.

As the armature core 53 is drawn upwardly by the energizing of the pressure solenoids 72 and 73, a bridging contact 127 mounted on the upper part of the stem 95, as shown in Fig. 5, is carried into contact with a pair of stationary contacts 128 and 129. Thereupon current flows from the main 87 through the wire 92 and through a branch wire 130 to a solenoid 131 controlling the switch for the quick acting solenoids 74 and 75, and thence returns from the solenoid 131 through a return wire 132 to the contact 128, thence through the sliding, bridging contact 127 and contact 129 to a return wire 133 leading to the switch 119 which, being closed, connects the wire 133 with the return wire 118 of the main 86. The solenoid 131 is thereupon energized and closes a controlling switch 134 for the quick acting solenoids 74 and 75 and for the high pressure air valve solenoid 47. Upon the closure of the switch 134 current flows from the wire 92 through the wire 130, switch 134 and through the wire 135 to the solenoid 47 of the high pressure air valve, and thence returns through a return wire 133 and wire 123, and thence passes through the switch 119 to the return wire 118 and main 86. Current also passes from the wire 135 through branch wire 136 to the quick acting solenoids 74 and 75 and thence returns through a branch wire 137 to the wire 133. Through the action of the quick acting pressure solenoids 74 and 75 the armature cores 53 are raised to their uppermost position and this movement is aided by the opening of the by-pass valve 46, and admission of maximum air pressure to the upper ends of the cylinders 34.

As the armature cores 53 of the solenoids approach their upward limit of movement, the contact 124 is opened thus breaking the circuit through the solenoid 83 and opening the alternating current switch 82 and terminating the welding current. Immediately thereafter the sliding contact 93, 96, is opened, thereby opening the circuit through the solenoid 99. Accordingly, the switches 103 and 104 are opened thereby breaking the circuit through solenoid 117 and opening the switches 119 and 120 which, in turn, breaks the circuit through solenoid 131 and opens the switch 134. Thus the high pressure valve 46 is closed and all of the pressure solenoids 72—75 are de-energized. The cross-head 16 is, therefore, held downwardly only by the air pressure in the cylinders 34. The handle 68 is thereupon swung to the right, bringing the split nut 69 and flange 70 in position to pass upwardly through the opening 71 in the block 64 and depressing the push button 88. As the push button 88 is depressed it breaks the contact between contacts 105 and 106, thus opening the circuit through the solenoid 109 and opening the switch 111 to also de-energize the valve solenoids 43 and 49 and reverse the position of the valves 42 and 48. Air is thereby admitted to the lower ends of the cylinders 34 and exhausted from the upper ends, lifting the cross-head and electrode 13. At the same time the push button 88 bridges the contacts 90 and 91, thus establishing a circuit through the solenoid 99 and restoring the switches 103 and 104 for a subsequent welding.

The above invention accordingly provides a method in which the two parts to be welded are brought into contact, current is then passed through the parts to heat them to a fusion or welding temperature at their abutting edges and immediately thereafter magnetic force is applied to the parts with increasing pressure, the rate of increase being suddenly greatly increased and the welding current being broken as the pressure reaches its maximum, whereupon the pressure is immediately released and the electrodes separated to permit removal of the welded parts. The provision of the slow acting and quick acting solenoids in association with each other provides a steady, timed take-up of the metal under gradually increasing pressure and then when those portions not immediately adjacent the contacting surfaces and, therefore, not at the maximum temperature, approach each other, the maximum pressure is quickly applied to force the metal of the parts together and compact it under the maximum pressure possible. The wiring arrangement permits the successive steps to be carried on quickly and in proper sequence and at the exact time and position that is most effective for the formation of a dense and solid weld.

As changes of construction could be made within the scope of my invention, it is intended that all matter contained in the above description or shown in the accompanying drawings shall be interpreted as illustrative and not in a limiting sense.

What I claim is:

1. Welding apparatus which comprises a pair of electrodes, means for bringing one electrode toward the other, a solenoid having quick acting and slow acting coils, an armature core in the fields of said solenoids, and means for transmitting power from said armature core to said moving electrode.

2. Welding apparatus which comprises a pair of electrodes, means for bringing one electrode toward the other, a solenoid having quick acting and slow acting coils, means for energizing said slow acting and said quick acting coils in succession, an armature core in the field of said electrodes, and means for transmitting power from said armature core to said movable electrode.

3. Welding apparatus which comprises a stationary electrode, an electrode movable to and from said stationary electrode, means for moving said movable electrode to and from said stationary electrode, and solenoids having slow acting and quick acting coils arranged to apply pressure to said movable electrode in successive increments and at increasing speeds.

4. Welding apparatus which comprises a pair of electrodes, means for bringing said electrodes towards each other, a solenoid having slow acting and quick acting coils, and means actuated successively by the magnetic fields of said slow acting and quick acting solenoids to press said electrodes towards each other.

5. Welding apparatus which comprises a stationary electrode, an electrode movable to and from said stationary electrode, pneumatic means for moving said movable electrode towards said stationary electrode, and solenoids having quick acting and slow acting coils arranged to apply pressure to said movable electrode in successive increments and at increasing speeds.

6. Welding apparatus which comprises a pair of electrodes, pneumatic means for bringing one electrode towards the other under pressure, a solenoid, a toggle between said electrode and a fixed support, means for connecting and disconnecting said toggle to said electrode, a lever at one end of said solenoid, and a link connecting the opposite end of said lever to said toggle and acting to straighten said toggle when said lever and link approach alignment.

7. Welding apparatus which comprises a pair of electrodes, means for bringing one electrode towards the other, a quick acting and a slow acting solenoid, an armature core in the fields of said solenoids, and means driven from said armature core for moving said electrode under pressure.

8. Welding apparatus which comprises a pair of electrodes, means for bringing one electrode towards the other, a quick acting and a slow acting solenoid, an armature core for said solenoids, means driven from said armature core for moving said electrode under pressure, and means actuated by the movement of said armature core to connect said quick acting solenoid in succession to said slow acting solenoid.

9. Welding apparatus which comprises a pair of electrodes, means for bringing one electrode towards the other, a quick acting and a slow acting solenoid, an armature core in the fields of said solenoids, means driven from said armature core for moving said electrode under pressure, means actuated by the movement of said armature core to energize said quick acting solenoid at a definite period in the movement of said armature and for thereafter de-energizing said slow acting and said quick acting solenoids.

10. Welding apparatus which comprises a pair of electrodes, means for bringing one electrode towards the other, means for passing current from one electrode to the other, a quick acting and a slow acting solenoid, armature cores for said solenoids, means driven from said armature cores for moving said electrode under pressure, and switches actuated by the movement of said armature cores to successively connect said slow acting and said quick acting solenoids and to thereafter interrupt the current through said electrodes and de-energize said solenoids.

11. Welding apparatus which comprises a stationary electrode and a vertically movable electrode, a compressed air cylinder, a piston in said cylinder below said electrodes and connected to operate said movable electrode, and solenoids at the side of said electrodes and means actuated by said solenoids to independently move said movable electrode.

12. Welding apparatus which comprises a stationary electrode, an electrode movable to and from one end of said stationary electrode, a cylinder, a piston in said cylinder positioned to act on the opposite end of said electrode, solenoids at the sides of said electrodes, means for moving said movable electrode endwise by said piston, and means for transmitting pressure from said solenoids to said movable electrode.

13. Welding apparatus which comprises a stationary electrode and a movable electrode, pneumatic means for moving said movable electrode to and from said stationary electrode, electro-magnetic valves for controlling the admission of pressure fluid to said pneumatic means for moving said electrode, quick acting and slow acting solenoids, means to apply the electro-magnetic force of said solenoids to said movable electrode, a contact on said movable electrode, a main control switch actuated by the said contact to control said solenoids, and means for closing said main control switch when said electrode mounted contact is closed.

14. Welding apparatus which comprises a stationary electrode and a movable electrode, slow acting and quick acting solenoids, means to successively apply electro-magnetic pressure from said solenoids to said movable electrode, a switch in an electric circuit for energizing said slow acting solenoid, and subsequent electrode controlled switches for energizing said quick acting solenoid and then de-energizing said solenoids at successive positions of said electrodes.

15. Welding apparatus which comprises a pair of electrodes, one electrode being movable toward the other, a solenoid, a core positioned to be drawn upwardly in the field of said solenoid, and means for transmitting motion from said core to said movable electrode to move said electrode toward the other electrode when said core is drawn upwardly.

16. Welding apparatus which comprises a pair of electrodes, one electrode being movable toward the other, a solenoid, a core positioned to be drawn upwardly in the field of said solenoid, and power multiplying means actuated by said upwardly moving core to move said movable electrode toward the other electrode.

17. Welding apparatus which comprises a pair of electrodes, one electrode being movable toward the other, a solenoid, a core for said solenoid positioned to be drawn upwardly into the field of said solenoid against the action of gravity, a lever, means for suspending said core from said lever, and power transmitting means from said lever to said movable electrode.

18. Welding apparatus which comprises a pair of electrodes, one electrode being movable toward the other, a solenoid, a core for said solenoid positioned to be drawn upwardly in the field of said solenoid against the action of gravity, a lever, means for suspending said core from said lever, a toggle between said movable electrode and a fixed support, and a link from said lever to said toggle to straighten said toggle as said core is drawn upwardly in the field of said solenoid.

In witness whereof I have hereunto signed my name.

HENRY S. HOLMES.